G. O. COLE.
Fruit Vender's Dish.

No. 209,864. Patented Nov. 12, 1878.

WITNESSES
INVENTOR

UNITED STATES PATENT OFFICE.

GEORGE O. COLE, OF HILLSDALE, NEW JERSEY.

IMPROVEMENT IN FRUIT-VENDERS' DISHES.

Specification forming part of Letters Patent No. 209,864, dated November 12, 1878; application filed August 29, 1878.

*To all whom it may concern:*

Be it known that I, GEORGE O. COLE, of Hillsdale, in the county of Bergen and State of New Jersey, have invented certain new and useful Improvements in Fruit-Venders' Dishes; and I do hereby declare that the following is a full, clear, and exact description thereof, reference being had to the accompanying drawings, and to the letters of reference marked thereon, which form part of this specification.

The nature of my invention consists in the construction of a butter-boat or butter and fruit dish, made of a single piece of thin wood, cut so as to form a projecting handle at each end, as will be hereinafter more fully set forth.

In order to enable others skilled in the art to which my invention appertains to make and use the same, I will now proceed to describe its construction and operation, referring to the annexed drawing, in which—

Figure 2:
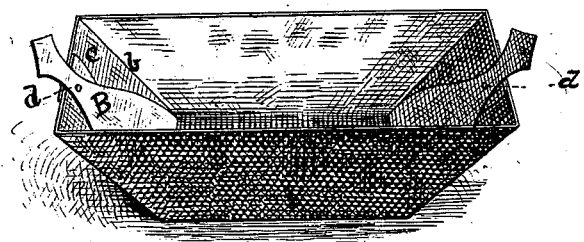
Figure 1:
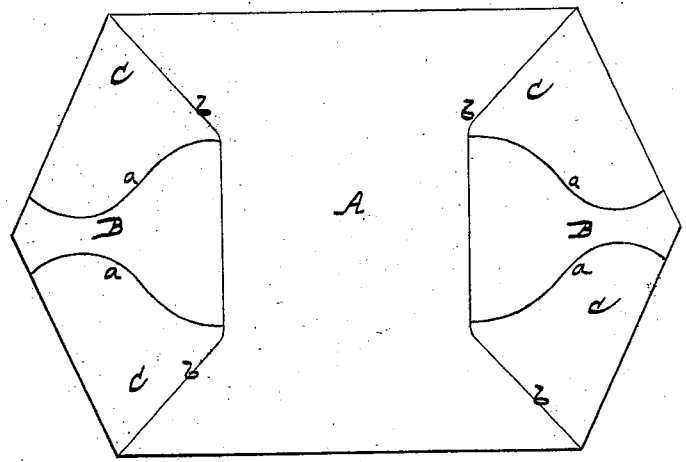

Figure 2 is a perspective view of the improved butter-dish, and Fig. 1 shows the blank from which the same is made.

A represents the blank from which the butter or fruit dish is made, said blank being of substantially the form shown in the drawing. At each end this blank is cut on the two curved lines $a\ a$, leaving between them a tongue, B, which is as wide at its base as the width of the bottom of the dish is to be. The two pieces $c\ c$ at the ends of the blank, on opposite sides of the tongue B, form the ends of the dish by being folded on the lines $b\ b$, and said pieces or wings overlapping each other on the outer side of the tongue B, the three pieces being then fastened together by a pin, rivet, or wire, $d$. The end of the tongue B then projects beyond the wings $c$, and forms the handle for the dish, there being thus a handle at each end, formed in one piece with the body of the dish.

I am fully aware that butter-boats or butter-dishes made of one piece of thin wood are not new, and I do not therefore claim such, broadly, as my invention.

Having thus fully described my invention, what I claim as new, and desire to secure by Letters Patent, is—

A butter or fruit dish formed of a blank, A, cut at each end to form the center tongue, B, and side wings, $c\ c$, the tongues B B forming, when the dish is completed, projecting handles at the ends, substantially as herein set forth.

In testimony that I claim the foregoing as my own I affix my signature in presence of two witnesses.

GEO. O. COLE.

Witnesses:
M. GOLDSTEIN,
HENRY OPPENHEIMER.